United States Patent
Burton

(10) Patent No.: US 10,183,285 B2
(45) Date of Patent: Jan. 22, 2019

(54) PROCESS FOR PREPARING A MOLECULAR SIEVE

(71) Applicant: ExxonMobil Research and Engineering Company, Annandale, NJ (US)

(72) Inventor: Allen W. Burton, Stewartsville, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 71 days.

(21) Appl. No.: 15/529,721

(22) PCT Filed: Dec. 22, 2015

(86) PCT No.: PCT/US2015/067335
§ 371 (c)(1),
(2) Date: May 25, 2017

(87) PCT Pub. No.: WO2016/122809
PCT Pub. Date: Aug. 4, 2016

(65) Prior Publication Data
US 2017/0326535 A1 Nov. 16, 2017

Related U.S. Application Data

(60) Provisional application No. 62/109,871, filed on Jan. 30, 2015.

(30) Foreign Application Priority Data

Mar. 16, 2015 (EP) ..................................... 15159203

(51) Int. Cl.
*C01B 39/48* (2006.01)
*B01J 29/76* (2006.01)
(Continued)

(52) U.S. Cl.
CPC .............. *B01J 29/76* (2013.01); *B01J 20/18* (2013.01); *B01J 29/78* (2013.01); *C01B 37/007* (2013.01);
(Continued)

(58) Field of Classification Search
CPC ....... C01B 37/007; C01B 39/12; C01B 39/48; B01J 29/76; B01J 29/78; B01J 20/18
See application file for complete search history.

(56) References Cited

U.S. PATENT DOCUMENTS 4,310,440 A * 1/1982 Wilson ................. B01J 20/0292
208/112
4,859,442 A * 8/1989 Zones ....................... B01J 29/04
423/706

(Continued)

OTHER PUBLICATIONS

Nakagawa et al., "Guest/host relationships in zeolite synthesis: ring-substituted piperidines and the remarkable adamantane mimicry by 1-azonio spiro [5.5] undecanes" Microporous and Mesoporous Materials, Jun. 17, 1998, pp. 69-85, vol. 22, iss. 1-3, Science Direct.

(Continued)

*Primary Examiner* — David M Brunsman
(74) *Attorney, Agent, or Firm* — Liza Negron; Lisa K. Holthus

(57) ABSTRACT

Synthesis of molecular sieves of the STT and ITE framework types using, as a structure directing agent Q, $[L(DETA)_2]^{2+}$ cation or $[L(TEPA)]^{2+}$ cation, or a mixture thereof, where L is a divalent metal cation comprising at least one of Ni, Co and Mn and DETA is diethylene triamine and TEPA is tetraethylene pentamine.

15 Claims, 2 Drawing Sheets

(51) Int. Cl.
*B01J 29/78* (2006.01)
*B01J 20/18* (2006.01)
*C01B 37/00* (2006.01)
*C01B 39/12* (2006.01)

(52) U.S. Cl.
CPC .............. *C01B 39/12* (2013.01); *C01B 39/48* (2013.01); *B01J 2229/186* (2013.01); *C01P 2002/70* (2013.01); *C01P 2002/74* (2013.01)

(56) References Cited

U.S. PATENT DOCUMENTS

| | | | | |
|---|---|---|---|---|
| 5,281,407 | A * | 1/1994 | Nakagawa | C01B 37/02 423/328.1 |
| 6,049,018 | A * | 4/2000 | Calabro | B01J 29/04 423/706 |
| 2013/0034482 | A1 * | 2/2013 | Zones | B01D 53/9413 423/213.5 |

OTHER PUBLICATIONS

Brunauer et al., "Adsorption of Gases in Multimolecular Layers", Journal of the American Chemical Society, Feb. 1938, pp. 309-319, vol. 60(2), ACS Publications.

Camblor et al., "SSZ-23: An Odd Zeolite with Pore Openings of Seven and Nine Tetrahedral Atoms", Angewandte Chemie International Edition, Aug. 17, 1998, pp. 2122-2126, vol. 37(15), Wiley Online Library.

Zones et al., "A Study of Piperidinium Structure-Directing Agents in the Synthesis of Silica Molecular Sieves under Fluoride-Based Conditions" Journal of the American Chemical Society, 2007, pp. 9066-9079, vol. 129(19), ACS Publications.

Ren et al., "Designed copper-amine complex as an efficient template for one-pot synthesis of Cu-SSZ-13 zeolite with excellent activity for selective catalytic reduction of NOx by NH3", Chemical Communications, 2011, pp. 9789-9791, vol. 47, Royal Society of Chemistry.

International Search Report and Written Opinion PCT/US2015/067335 dated Apr. 28, 2016.

* cited by examiner

PROCESS FOR PREPARING A MOLECULAR SIEVE

CROSS-REFERENCE TO RELATED APPLICATIONS

This application is a National Stage Application of International Application No. PCT/US2015/067335, filed Dec. 22, 2015 and claims the benefits of and priorities to U.S. Provisional Application No. 62/109,871, filed Jan. 30, 2015 and EP Application No. 15159203.7, filed Mar. 16, 2015, the disclosures of which are incorporated by their reference in their entireties.

FIELD OF THE INVENTION

The present invention relates to a process of synthesizing molecular sieves in which transition metal complexes are used as structure directing agents.

BACKGROUND

Molecular sieve materials, both natural and synthetic, have been demonstrated in the past to be useful as adsorbents and to have catalytic properties for various types of hydrocarbon conversion reactions. Certain molecular sieves, such as zeolites, AlPOs, and mesoporous materials, are ordered, porous crystalline materials having a definite crystalline structure as determined by X-ray diffraction (XRD). Within the crystalline molecular sieve material there are a large number of cavities which may be interconnected by a number of channels or pores. These cavities and pores are uniform in size within a specific molecular sieve material. Because the dimensions of these pores are such as to accept for adsorption molecules of certain dimensions while rejecting those of larger dimensions, these materials have come to be known as "molecular sieves" and are utilized in a variety of industrial processes.

Such molecular sieves, both natural and synthetic, include a wide variety of crystalline silicates. These silicates can be described as rigid three-dimensional frameworks of $SiO_4$ tetrahedra (which have four oxygen atoms at the apexes with the silicon atom being at the center) and Periodic Table Group 13 element oxide (e.g., $AlO_4$, $BO_4$) tetrahedra (which have four oxygen atoms at the apexes with the Periodic Table Group 13 element being at the center). These tetrahedra are regularly and three dimensionally cross-linked by the sharing of apex oxygen atoms. This arrangement provides a three-dimensional network structure defining pores that differ in size and shape, depending on the arrangement of tetrahedral and composition of the structure. In its simplest terms, the material may be considered as a silicate material in which some of the $Si^{4+}$ ions in the silicate are replaced by Periodic Table Group 13 elements such as $Al^{3+}$ or $B^{3+}$ ions. For each $Si^{4+}$ ion replaced by a Periodic Table Group 13 element, the charge must be balanced by the inclusion in the crystal of a cation, for example a proton, an alkali metal or an alkaline earth metal cation. This can be expressed wherein the mole ratio of the Group 13 element (e.g., aluminum or boron) to the number of various cations, such as $H^+$, $Ca^{2+}/2$, $Sr^{2+}/2$, $Na^+$, $K^+$, or $Li^+$, is equal to unity. It is the presence of framework aluminum in aluminosilicates which is important in providing, for instance, the catalytic properties of these materials.

Molecular sieves that find application in catalysis include any of the naturally occurring or synthetic crystalline molecular sieves. Examples of these molecular sieves include large pore zeolites, intermediate pore size zeolites, and small pore zeolites. These zeolites and their isotypes are described in "Atlas of Zeolite Framework Types", eds. Ch. Baerlocher, L. B. McCusker, D. H. Olson, Elsevier, Sixth Revised Edition, 2007, which is hereby incorporated by reference. A large pore zeolite generally has a pore size of at least about 6.0 to 7.5 Å and includes LTL, MAZ, FAU, OFF, *BEA, and MOR framework type zeolites (IUPAC Commission of Zeolite Nomenclature). Examples of large pore zeolites include mazzite, offretite, zeolite L, zeolite Y, zeolite X, omega, and beta. An intermediate pore size zeolite generally has a pore size from about 4.5 Å to less than about 7 Å and includes, for example, MFI, MEL, EUO, MTT, MFS, AEL, AFO, HEU, FER, MWW, and TON framework type zeolites (IUPAC Commission of Zeolite Nomenclature). Examples of intermediate pore size zeolites include ZSM-5, ZSM-11, ZSM-22, ZSM-57, MCM-22, silicalite 1, and silicalite 2. A small pore size zeolite has a pore size from about 3 Å to less than about 5.0 Å and includes, for example, AEI, CHA, ERI, KFI, LEV, SOD, and LTA framework type zeolites (IUPAC Commission of Zeolite Nomenclature). Examples of small pore zeolites include ZK-4, SAPO-34, SAPO-35, ZK-14, SAPO-42, ZK-21, ZK-22, ZK-5, ZK-20, zeolite A, chabazite, zeolite T, and ALPO-17.

Synthesis of molecular sieve materials typically involves the preparation of a synthesis mixture which comprises sources of all the elements present in the molecular sieve often with a source of hydroxide ion to adjust the pH. In many cases a structure directing agent is also present. Structure directing agents are compounds which are believed to promote the formation of molecular sieves and which are thought to act as templates around which certain molecular sieve structures can form and which thereby promote the formation of the desired molecular sieve. Various compounds have been used as structure directing agents including various types of quaternary ammonium cations.

The synthesis of molecular sieves is a complicated process. There are a number of variables that need to be controlled in order to optimize the synthesis in terms of purity, yield and quality of the molecular sieve produced. A particularly important variable is the choice of synthesis template (structure directing agent), which usually determines which framework type is obtained from the synthesis. This is mentioned for example in U.S. Pat. No. 4,310,440 (Wilson et al.), which teaches that "not all templating agents suitably employed in the preparation of certain species are suitable for the preparation of all members of the generic class." It is also well known that the same template may induce the formation of different framework types. Quaternary ammonium ions are typically used as the structure directing agents in the preparation of zeolite catalysts. For example, zeolite MCM-68 may be made from quaternary ammonium ions as is described in U.S. Pat. No. 6,049,018. Other known zeolites that are typically produced using quaternary ammonium ions include SSZ-13, SSZ-15, SSZ-24, SSZ-31, and SSZ-37 as described in U.S. Pat. No. 5,281,407 and U.S. Pat. No. 5,641,393.

The "as-synthesized" molecular sieve will contain the structure directing agent in its pores, and is usually subjected to a calcination step to burn out the structure directing agent and free up the pores. For many catalytic applications, it is also desired to include metal cations such as metal cations of Groups 2 to 15 of the Periodic Table of the Elements within the molecular sieve structure. This is typically accomplished by ion exchange treatment. However, such ion exchange treatment most often does not result in full or near full exchange of the metal cations that were originally present with the desired Groups 2 to 15 metal cations.

SSZ-23 (STT framework type) has been prepared by Zones using N,N,N-trimethyladamantammonium cation as structure directing agent, as described in U.S. Pat. No. 4,859,442. It was later found that SSZ-23 could be prepared in all-silica, fluoride-mediated compositions using the same structure directing agent. SSZ-23 has also been prepared using a spiro-derivative of 2,6-dimethylpiperidine in aluminum-containing, hydroxide mediated systems (Y. Nakagawa, G. S. Lee, T. V. Harris, L. T. Yuen, S. I. Zones, Microporous and Mesoporous Materials, Vol 22, 1-3, 69-85, 1998). However, those known ammonium cation structure directing agents are relatively expensive.

The preparation of ITQ-3 (ITE framework type) is disclosed in U.S. Pat. No. 6,500,404, using N,N-dimethyl-6-azonium-1,3,3-trimethylbicyclo(3.2.1.)octane hydroxide as structure directing agent. Again, such a structure directing agent is expensive.

It is important to identify new structure directing agents and more efficient methods for the synthesis of molecular sieves to facilitate the preparation of new molecular sieves and/or to reduce the cost of making known zeolites, for instance molecular sieves of STT or ITE framework type such as SSZ-23 and ITQ-3. It is also of interest to provide a method for the preparation of molecular sieves comprising highly-dispersed metal species within their structure.

SUMMARY OF THE INVENTION

The present invention provides a process for producing a molecular sieve of framework type STT or ITE, the process comprising the steps of:
(i) preparing a synthesis mixture capable of forming a molecular sieve, said synthesis mixture comprising water, a source of silicon, a source of a trivalent element X, optionally a source of a pentavalent element Z, optionally a source of hydroxide ions, optionally a source of halide ions $W^-$, and optionally a source of alkali metal ions $M^+$, the synthesis mixture further comprising, as structure directing agent Q, $[L(DETA)_2]^{2+}$ cation or $[L(TEPA)]^{2+}$ cation, or a mixture thereof, where L is a divalent metal cation comprising at least one of Ni, Co and Mn;
(ii) heating said synthesis mixture under crystallisation conditions for a time of from about 1 to about 100 days to form crystals of said molecular sieve of structure type STT or ITE; and
(iii) recovering said crystals of the molecular sieve from the synthesis mixture.

DETA is diethylene triamine, $H_2NCH_2CH_2NHCH_2CH_2NH_2$. TEPA is tetraethylene pentamine, $H_2NCH_2CH_2NHCH_2CH_2NHCH_2CH_2NHCH_2CH_2NH_2$. L is a divalent metal ion that can form octahedral complexes with said DETA and/or TEPA and is for instance chosen from the group consisting of at least nickel, cobalt and manganese cations. Preferably, L is Ni cation ($Ni^{+2}$). The DETA and TEPA complexes of those metals are relatively inexpensive to prepare, and we have found that they can be used as structure directing agents to promote the formation of cage-based molecular sieves, such as STT and ITE molecular sieves. They can therefore offer a cost effective alternative to the structure directing agents currently known for the preparation of important STT and ITE molecular sieves, such as SSZ-23 and ITQ-3. SSZ-23 and ITQ-3 in particular have heretofore been available using only relatively expensive quaternary ammonium or azonium cations as structure directing agent.

In a further aspect, the invention provides a crystalline molecular sieve of structure type STT or ITE made by the process of the invention. Said crystalline molecular sieve can be in its as-synthesized or in its calcined form.

In another aspect, the present invention provides a crystalline molecular sieve having the STT or ITE framework type and containing, within its pore structure, a structure directing agent Q selected from $[L(DETA)_2]^{2+}$ cation, $[L(TEPA)]^{2+}$ cation and mixtures thereof, wherein L is a divalent metal cation comprising at least one of Ni, Co and Mn. In this "as-synthesized" form, the molecular sieve includes the structure directing agent Q within its pores and the metal ion L is therefore highly-dispersed through the pores of the molecular sieve. Preferably, the molecular sieve is selected from the group consisting of SSZ-23 and ITQ-3. The molecular sieve may be, for example, an aluminosilicate or a borosilicate, preferably, a borosilicate.

The invention also provides, in further aspects, the use of the crystalline molecular sieve, in its as-synthesized or in its calcined form, optionally after further modification such as by ion exchange, as an adsorbent or catalyst. The molecular sieve of the present invention is preferably used in its calcined form.

The present invention thus also relates to a process for converting a feedstock comprising an organic compound to a conversion product which process comprises contacting said feedstock at organic compound conversion conditions with a catalyst comprising a molecular sieve according to the present invention or as prepared by the process of the present invention.

In another further aspect, the invention provides an adsorption process which comprises contacting a feedstream comprising one or more adsorbates under adsorption conditions with a molecular sieve according to the present invention or as prepared by the process of the present invention to effect adsorption of one or more of the adsorbates from the feedstream.

DETAILED DESCRIPTION OF THE INVENTION

Figure 1:
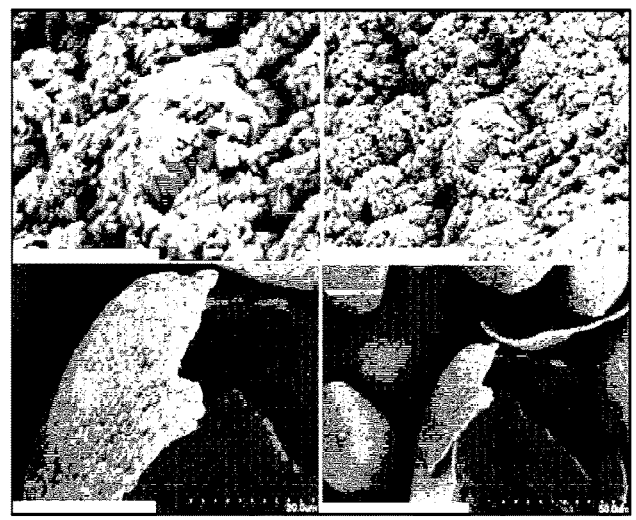
FIG. 1 shows scanning electron microscopy (SEM) images of the product of Example 1.

The present inventor has found that the use of $[L(DETA)_2]^{2+}$ cation or $[L(TEPA)]^{2+}$ cation, for example, $[Ni(DETA)_2]^{2+}$ cation or $[Ni(TEPA)]^{2+}$ cation, as a structure directing agent, provides a cost-effective process for making molecular sieves of the framework types STT and ITE, and that the resulting product molecular sieves contain the structure directing agent trapped within the pores in a highly-dispersed form. The process optionally therefore offers a route to those molecular sieves having highly-dispersed Ni, Co and/or Mn metal ions within their structure, without needing to carry out the conventional post-synthesis ion exchange treatment.

The Synthesis of Molecular Sieves

As mentioned above, the present invention provides a process for producing a molecular sieve of framework type STT or ITE, the process comprising the steps of:

(i) preparing a synthesis mixture capable of forming a molecular sieve, said synthesis mixture comprising water, a source of silicon, a source of a trivalent element X, optionally a source of a pentavalent element Z, optionally a source of hydroxide ions, optionally a source of halide ions $W^-$, and optionally a source of alkali metal ions $M^+$, the synthesis mixture further comprising, as structure directing agent Q, $[L(DETA)_2]^{2+}$ cation or $[L(TEPA)]^{2+}$ cation, or a mixture thereof, where L is a divalent metal cation comprising at least one of Ni, Co and Mn;

(ii) heating said synthesis mixture under crystallization conditions for a time of from about 1 to about 100 days to form crystals of said molecular sieve of structure type STT or ITE; and (iii) recovering said crystals of the molecular sieve from the synthesis mixture.

In a first embodiment, the synthesis mixture contains a pentavalent element Z in an amount of less than 1 mol % of the silica (molar ratio $Z/SiO_2$ in the synthesis mixture). In a second embodiment, the synthesis mixture contains a pentavalent element Z in an amount of more than 1 mol % of the silica. The pentavalent element Z may be, for example, phosphorus or arsenic, preferably phosphorus. In a third embodiment, the synthesis mixture does not contain any pentavalent element Z. Preferably, the molecular sieve is not an aluminophosphate (ALPO) or a silico-aluminophosphate (SAPO).

Suitable sources of silicon (Si) that can be used to prepare the synthesis mixture include silica; colloidal suspensions of silica, for example that sold by E.I. du Pont de Nemours under the tradename Ludox®; precipitated silica; alkali metal silicates such as potassium silicate and sodium silicate; tetraalkyl orthosilicates; and fumed silicas such as Aerosil and Cabosil.

The trivalent element X is most often one or more of B, Al, Fe, and Ga, preferably B, Al or a mixture of B and Al. More preferably, the trivalent element is B.

Suitable sources of trivalent element X that can be used to prepare the synthesis mixture depend on the element X that is selected (e.g., boron, aluminum, iron and gallium). In embodiments where X is boron, sources of boron include boric acid, sodium tetraborate and potassium tetraborate. Sources of boron tend to be more soluble than sources of aluminum in hydroxide-mediated synthesis systems. Optionally, the trivalent element X is aluminum, and the aluminum source includes aluminum sulfate, aluminum nitrate, aluminum hydroxide, hydrated alumina, such as boehmite, gibbsite, and pseudoboehmite, and mixtures thereof. Other aluminum sources include, but are not limited to, other water-soluble aluminum salts, sodium aluminate, aluminum alkoxides, such as aluminum isopropoxide, or aluminum metal, such as aluminum in the form of chips.

Alternatively or in addition to previously mentioned sources of Si and Al, aluminosilicates may also be used as a source of both Si and Al.

Suitable sources of pentavalent elements Z depend on the element Z that is selected. Preferably, Z is phosphorus. Suitable sources of phosphorus include one or more sources selected from the group consisting of phosphoric acid; organic phosphates, such as triethyl phosphate, tetraethylammonium phosphate; aluminophosphates; and mixtures thereof.

Optionally, the synthesis mixture also contains a source of halide ions $W^-$, which may be selected from the group consisting of chloride, bromide or fluoride. The source of halide ions may be any compound capable of releasing halide ions in the molecular sieve synthesis mixture. Non-limiting examples of sources of halide ions include hydrogen fluoride; salts containing one or several halide ions, such as metal halides, preferably where the metal is sodium, potassium, calcium, magnesium, strontium or barium; ammonium fluoride; or tetraalkylammonium fluorides such as tetramethylammonium fluoride or tetraethylammonium fluoride. If the halide ion is fluoride, a convenient source of halide ion is HF.

Optionally, the synthesis mixture also contains a source of alkali metal $M^+$. If present, the alkali metal $M^+$ is preferably selected from the group consisting of sodium, potassium and mixtures of sodium and potassium. The sodium source may be a sodium salt such as NaCl, NaBr, or $NaNO_3$; sodium hydroxide or sodium aluminate. The potassium source may be potassium hydroxide or potassium halide such as KCl or NaBr or potassium nitrate.

Optionally, the synthesis mixture also contains a source of hydroxide ions, for example, an alkali metal hydroxide such as sodium hydroxide or potassium hydroxide. Hydroxide can also be present as a counter ion of the structure directing agent or by the use of aluminum hydroxide as a source of X.

The synthesis mixture further comprises a structure directing agent (SDA) Q, selected from the group consisting of $[L(DETA)_2]^{2+}$ cation or $[L(TEPA)]^{2+}$ cation, or mixtures thereof, where L is a divalent metal cation comprising at least one of Ni, Co and Mn. Preferably, L is Ni and Q is $[Ni(DETA)_2]^{2+}$ cation or $[Ni(TEPA)]^{2+}$ cation. The structure directing agent Q may be present in any suitable form, for example as a halide, such as a chloride or a bromide, as a hydroxide or as a nitrate. The structure directing agent Q is preferably present in its hydroxide or nitrate form. In one embodiment, Q is $[L(DETA)_2]^{2+}$ cation and the molecular sieve produced is SSZ-23. In another embodiment, Q is $[L(TEPA)]^{2+}$ cation and the molecular sieve produced is ITQ-3.

The synthesis mixture can have any composition which is suitable for preparing the desired molecular sieve. The following ranges are given as examples of desirable and preferred ranges for each pair of components in the synthesis mixture. Conveniently, the molar ratio of $SiO_2:X$ in the synthesis mixture may be in the range of from 1 to 20, preferably from 4 to 12. Optionally, in the synthesis mixture the molar ratio of $Q:SiO_2$ is in the range of from 0.04 to 0.5, preferably from 0.08 to 0.3. Optionally, in the synthesis mixture the molar ratio of $H_2O:SiO_2$ is in the range of from 5 to 100, preferably from 10 to 60. Optionally, in the synthesis mixture the molar ratio of $M^+:SiO_2$ is in the range of from 0 to 0.45, preferably from 0 to 0.20. Optionally, in the synthesis mixture the molar ratio of $OH^-:SiO_2$ is in the range of from 0.2 to 0.5, preferably from 0.25 to 0.4. Optionally, in the synthesis mixture the molar ratio of $W^-:SiO_2$ is in the range of from 0 to 1, preferably from 0 to 0.5. The reaction mixture may for example have a composition, expressed in terms of mole ratios, as indicated in the following Table:

| Mole ratio | Useful | Preferred |
|---|---|---|
| $SiO_2/X$ | 1 to 20 | 4 to 12 |
| $Q/SiO_2$ | 0.04 to 0.5 | 0.08 to 0.3 |
| $H_2O/SiO_2$ | 5 to 100 | 10 to 60 |
| $M^+/SiO_2$ | 0 to 0.45 | 0 to 0.20 |
| $OH^-/SiO_2$ | 0.2 to 0.5 | 0.25 to 0.4 |
| $W^-/SiO_2$ | 0 to 1 | 0 to 0.5 |

The synthesis may be performed with our without added nucleating seeds. If nucleating seeds are added to the synthesis mixture, the seeds are suitably present in an amount from about 0.01 ppm by weight to about 10,000 ppm by weight, based on the synthesis mixture, such as from about 100 ppm by weight to about 5,000 ppm by weight of the synthesis mixture. The seeds can for instance be selected from SSZ-23 and ITQ-3 to molecular sieves.

Crystallization can be carried out under either static or stirred conditions in a suitable reactor vessel, such as for example, polypropylene jars or Teflon® lined or stainless steel autoclaves. The crystallization is typically carried out at a temperature of about 100° C. to about 200° C., such as about 150° C. to about 170° C., for a time sufficient for crystallization to occur at the temperature used, e.g., from about 1 day to about 100 days, in particular from 1 to 50 days, for example from about 2 days to about 40 days. Thereafter, the synthesized crystals are separated from the mother liquor and recovered.

In a preferred embodiment, the resulting molecular sieve is an aluminosilicate or a borosilicate, especially a borosilicate.

The product of the synthesis reaction is a crystalline molecular sieve having the STT or ITE framework type and containing, within its pore structure, the structure directing agent Q used in the synthesis, i.e. $[L(DETA)_2]^{2+}$ cation and/or $[L(TEPA)]^{2+}$ cation where L is a divalent metal cation comprising at least one of Ni, Co and Mn. In its as-synthesized form, the molecular sieve of the present invention or manufactured by the process of the present invention typically has a chemical composition having the following molar relationship:

$$mQ:(n)SiO_2:X_2O_3,$$

wherein
0.004<m/n≤0.15,
n is at least 10, such as about 10 to about 200,
Q is the structure directing agent,
X is a trivalent element, such as one or more of B, Al, Fe, and Ga, preferably Al, B or a mixture of Al and B, more preferably B.

In an especially preferred embodiment, the as-synthesized molecular sieve of the present invention or manufactured by the process of the present invention is SSZ-23 having a composition of $Si_{14}B_2O_{32}\cdot x[L(DETA)_2]^{2+}\cdot yM^+$, where x+0.5y=1. Preferably, x is greater than 0.5, more preferably greater than 0.9, and is most preferably substantially equal to 1.0. In a most preferred embodiment, x=1 and y=0.

In another preferred embodiment, the as-synthesized molecular sieve of the present invention or manufactured by the process of the present invention is ITQ-3 having a composition of $Si_{14}B_2O_{32}\cdot x[L(TEPA)]^{2+}\cdot yM^+$, where x+0.5y=1. Preferably, x is greater than 0.5, more preferably greater than 0.9, and is most preferably substantially equal to 1.0. In a most preferred embodiment, x=1 and y=0.

In an especially preferred embodiment, the as-synthesized molecular sieve of the present invention or manufactured by the process of the present invention comprises from 1.0 to 10.0 wt %, preferably from 3.0 to 6.5 wt % of $L^{2+}$, for example of $Ni^{2+}$.

Since the as-synthesized crystalline molecular sieve contains the structure directing agent Q within its pore structure, the product is typically activated before use in such a manner that the organic part of the structure directing agent, i.e., the organic ligand, is at least partially removed from the molecular sieve. The activation process is typically accomplished by calcining, more particularly by heating the molecular sieve at a temperature of at least about 200° C., preferably at least about 300° C., more preferably at least about 370° C. for at least 1 minute and generally not longer than 20 hours. While subatmospheric pressure can be employed for the thermal treatment, atmospheric pressure is usually desired for reasons of convenience. The thermal treatment can be performed at a temperature up to about 925° C. For instance, the thermal treatment can be conducted at a temperature of from 400 to 600° C., for instance from 500 to 550° C., in the presence of an oxygen-containing gas.

Said calcined molecular sieve has the STT or ITE framework type and differs from STT and ITE molecular sieves of the prior art in that the divalent metal cation L, comprising at least one of Ni, Co and Mn, is highly-dispersed within the molecular sieve structure, through the pores. Preferably, the calcined molecular sieve is SSZ-23 or ITQ-3.

The molecular sieve material of the present invention or manufactured by the process of the present invention, in its calcined form, typically has a chemical composition having the following molar relationship:

$$(n)SiO_2:X_2O_3$$

wherein
n is at least about 10, such as about 10 to about 200 and
X is a trivalent element, such as one or more of B, Al, Fe, and Ga, preferably Al, B or a mixture of Al and B, more preferably B.

The calcined molecular sieve typically comprises from 1.0 to 12.0 wt % of $L^{2+}$, for example of $Ni^{2+}$, preferably from 3.0 to 10 wt %, more preferably from 3.0 to 6.5 wt %.

To the extent desired and depending on the $SiO_2:X_2O_3$ molar ratio of the material, the alkali or alkaline earth metal cations present in the as-synthesized molecular sieve can be replaced in accordance with techniques well known in the art, at least in part, by ion exchange with other cations. Preferred replacing cations include metal ions, hydrogen ions, hydrogen precursor, e.g., ammonium ions and mixtures thereof. Particularly preferred cations are those which tailor the catalytic activity for certain hydrocarbon conversion reactions. These include hydrogen, rare earth metals and metals of Groups 2 to 15 of the Periodic Table of the Elements. As used herein, the numbering scheme for the Periodic Table Groups is as disclosed in Chemical and Engineering News, 63(5), 27 (1985). Optionally, the molecular sieve is not subjected to any ion exchange treatment. In a preferred embodiment, the as-synthesized or calcined molecular sieve of the present invention is not ion exchanged with metal cations of Groups 2 to 15 of the Periodic Table of the Elements. Indeed, said as-synthesized or calcined molecular sieve already comprises L metal cations that are highly dispersed in the molecular sieve structure.

Use of the Molecular Sieves

The molecular sieve of the present invention or manufactured by the process of the present invention may be used as an adsorbent or as a catalyst to catalyze a wide variety of organic compound conversion processes including many of present commercial/industrial importance. Examples of preferred chemical conversion processes which can be effectively catalyzed by the crystalline material of the present invention or manufactured by the process of the present invention, by itself or in combination with one or more other catalytically active substances including other crystalline catalysts, include those requiring a catalyst with acid activity. Examples of organic conversion processes which may be catalyzed by molecular sieves of the present invention or manufactured by the process of the present invention include cracking, hydrocracking, isomerization, polymerization, reforming, hydrogenation, dehydrogenation, dewaxing, hydrodewaxing, adsorption, alkylation, transalkylation, dealkylation, hydrodecylization, disproportionation, oligomerization, dehydrocyclization and combinations thereof. The conversion of hydrocarbon feeds can take place in any convenient mode, for example in fluidized bed, moving bed, or fixed bed reactors depending on the types of process desired.

The molecular sieve of the present disclosure, when employed either as an adsorbent or as a catalyst in an organic compound conversion process should be dehydrated, at least partially. This can be done by heating to a temperature in the range of about 100° C. to about 500° C., such as about 200° C. to about 370° C. in an atmosphere such as air, nitrogen, etc., and at atmospheric, subatmospheric or superatmospheric pressures for between 30 minutes and 48 hours. Dehydration can also be performed at room temperature merely by placing the molecular sieve in a vacuum, but a longer time is required to obtain a sufficient amount of dehydration.

Once the molecular sieve has been synthesized, it can be formulated into a catalyst composition by combination with other materials, such as binders and/or matrix materials, that provide additional hardness or catalytic activity to the finished catalyst. These other materials can be inert or catalytically active materials.

In particular, it may be desirable to incorporate the molecular sieve of the present invention or manufactured by the process of the present invention with another material that is resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring or in the form of gelatinous precipitates or gels including mixtures of silica and metal oxides. Naturally occurring clays which may be used include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or after being subjected to calcination, acid treatment or chemical modification. These binder materials are resistant to the temperatures and other conditions, e.g., mechanical attrition, which occur in various hydrocarbon conversion processes. Thus the molecular sieves of the present invention or manufactured by the process of the present invention may be used in the form of an extrudate with a binder. They are typically bound by forming a pill, sphere, or extrudate. The extrudate is usually formed by extruding the molecular sieve, optionally in the presence of a binder, and drying and calcining the resulting extrudate.

Use of a material in conjunction with the molecular sieve of the present invention or manufactured by the process of the present invention, i.e., combined therewith or present during synthesis of the new crystal, which is active, tends to change the conversion and/or selectivity of the catalyst in certain organic conversion processes. Inactive materials suitably serve as diluents to control the amount of conversion in a given process so that products can be obtained in an economic and orderly manner without employing other means for controlling the rate of reaction. These materials may be incorporated into naturally occurring clays, e.g., bentonite and kaolin, to improve the crush strength of the catalyst under commercial operating conditions.

In addition to the foregoing materials, the molecular sieve can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia.

The relative proportions of molecular sieve and inorganic oxide matrix may vary widely, with the molecular sieve content ranging from about 1 to about 90 percent by weight and more usually, particularly when the composite is prepared in the form of beads, in the range of about 2 to about 80 weight percent of the composite.

The molecular sieve of the present invention or manufactured by the process of the present invention can also be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such component can be incorporated in the composition by way of cocrystallization; exchanged into the composition to the extent a Group IIIA element, e.g., aluminum, is in the structure; or intimately physically admixed therewith. Such components can also be impregnated in or onto the molecular sieve such as, for example, by treating the molecular sieve with a hydrogenating metal-containing ion. For instance, in the case of platinum, suitable platinum compounds for this purpose include chloroplatinic acid, platinous chloride and various compounds containing the platinum amine complex. Combinations of metals and methods for their introduction can also be used.

EXAMPLES

The following examples illustrate the present invention. Numerous modifications and variations are possible and it is to be understood that within the scope of the appended claims, the invention may be practiced otherwise than as specifically described herein.

In the following examples, various parameters were measured in order to define the properties of the products that were manufactured. These parameters were measured by techniques described below.

The overall surface area of the molecular sieves was determined by the BET method as described by S. Brunauer, P. H. Emmett and E. Teller, *J. Am. Chem. Soc.*, 1938, to 60, 309, using nitrogen adsorption-desorption at liquid nitrogen temperature. The internal surface area can be calculated using t-plot of the BET measurement.

The X-ray diffraction data (powder XRD) were collected with a Panalytical X'Pert Pro diffraction system with an Xcelerator multichannel detector, equipped with a germanium solid state detector, using copper K-alpha radiation. The diffraction data were recorded by step-scanning at 0.02 degrees two-theta, where theta is the Bragg angle, and using an effective counting time of 2 seconds for each step.

Preparation of the Hydroxide-Exchanged Form of the Nickel Complex of Diethylenetriamine [Ni(DETA)$_2$]$^{2+}$.(OH$^-$)$_2$ 25.48 g nickel nitrate hexahydrate (0.086 mol) and 18.02 g diethylene triamine (DETA, 0.175 mol) were dissolved in 200 mL deionized water. Upon addition of the DETA to the solution of nickel nitrate, the color of the solution turned from a transparent green to an intense purple. The solution was then added to 300 mL of Dowex hydroxide exchange resin (1.2 mmol OH/mL) in a polypropylene bottle. After about 20 hours, the solution was isolated by filtration of the exchange resin and washing the resin exhaustively with deionized water. The filtrates were then combined into a single solution and concentrated by rotary evaporation under reduced pressure at about 60° C. After the evaporation, the nickel concentration was 0.275 mmol/g.

Preparation of the Hydroxide-Exchanged Form of the Nickel Complex of Tetraethylene Pentamine [Ni(TEPA)]$^{2+}$.(OH$^-$)$_2$ 43.65 g nickel nitrate hexahydrate (0.15 mol) and 28.40 g tetraethylene pentamine (TEPA, 0.15 mol) were dissolved in about 250 mL deionized water. Upon addition of the TEPA to the solution of nickel nitrate, the color of the solution turned from a transparent green to an intense purple. The solution was then added to 500 mL of Dowex hydroxide exchange resin (1.2 mmol OH/mL) in a polypropylene bottle. After about 20 hours, the solution was isolated by filtration of the exchange resin and washing the resin exhaustively with deionized water. The filtrates were then combined into a single solution and concentrated by rotary evaporation under reduced pressure at about 60° C. After the evaporation, the nickel concentration was 0.57 mmol/g.

Example 1—Borosilicate STT Molecular Sieve (as-Synthesized Form)

7.89 g of the [Ni(DETA)$_2$]$^{2+}$.(OH$^-$)$_2$ solution described above ([Ni]=0.275 mmol/g) was mixed with 0.89 g deionized water and 0.19 g boric acid inside a Teflon liner for a 23-mL steel Parr autoclave. 2.25 g Ludox AS-40 (40 wt % SiO$_2$) was then added to the mixture. The liner was then capped, sealed inside the 23-mL autoclave, and heated at 160° C. under tumbling conditions (~40 rpm). The reactor was removed after 30 days, quenched, and the mauve-colored solids were isolated by filtration, washed exhaustively with deionized water, dried, and analyzed by powder XRD. The color of the solids could not be removed after trituration in 1 M HCl. The product was pure SSZ-23 comprising 7.1 wt % nickel. The relative intensities of the powder diffraction peaks were different from those of typical SSZ-23 because of the presence of nickel in the final product. FIG. 1 shows SEM images of the product.

Figure 2:
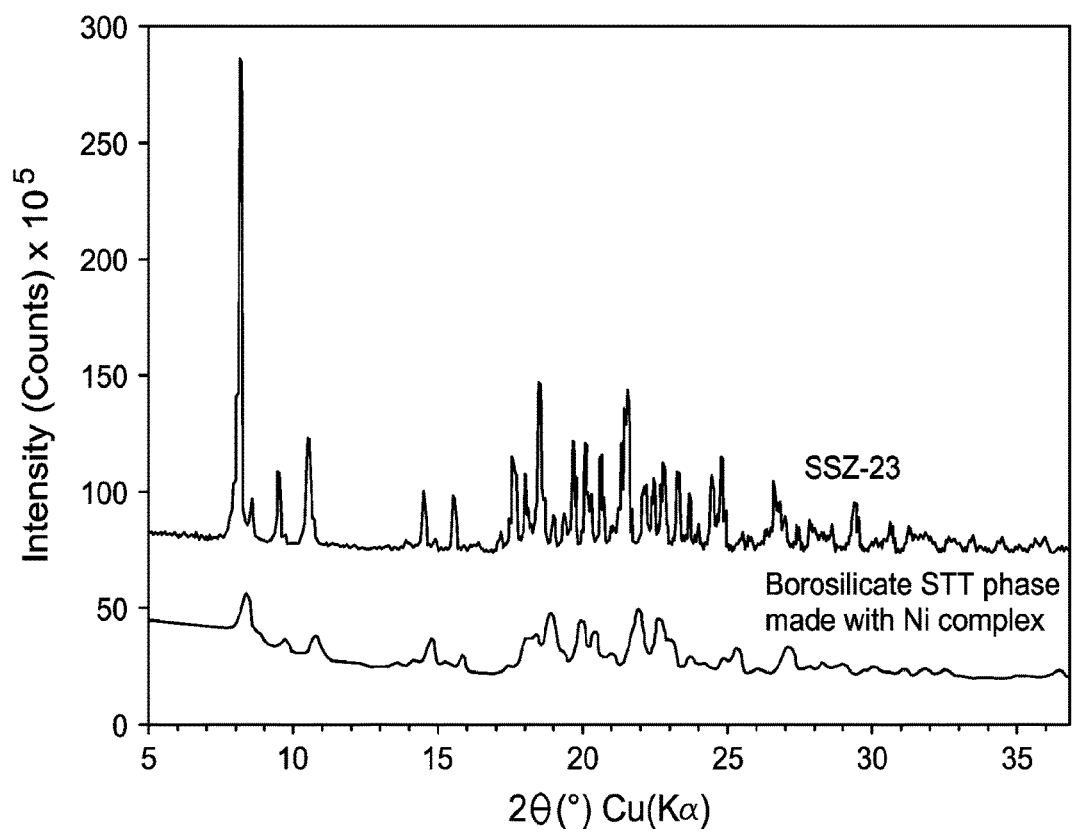
FIG. 2 shows the X-ray diffraction patterns for conventional SSZ-23 (upper line) compared to the STT phase material made according to the present invention using $[Ni(DETA)_2]^{2+}$ cation as structure directing agent (lower line).

FIG. 2 shows the XRD pattern of "as-synthesized" STT-phase material made according to the invention compared to the XRD pattern of conventional SSZ-23 (upper line). It can be seen that the "as-synthesized" material made according to the invention exhibits significant differences in relative intensity compared to the conventional SSZ-23, presumably due to the presence of Ni$^{2+}$ occluded within the cages of the framework. Ni is a strong scatterer of X-rays relative to the atoms of the framework.

Example 1a—Borosilicate STT Molecular Sieve (Calcined Form)

The product from Example 1 was heated inside a muffle furnace from ambient temperature to 400° C. at 4° C./min under a nitrogen atmosphere, then heated to 600° C. at 4° C./min in air, and maintained at 600° C. in air for 2 hours. After calcination, the color of the zeolite powder became light green. Powder XRD indicates the STT framework structure of SSZ-23 is preserved after the calcination.

Figure 4:
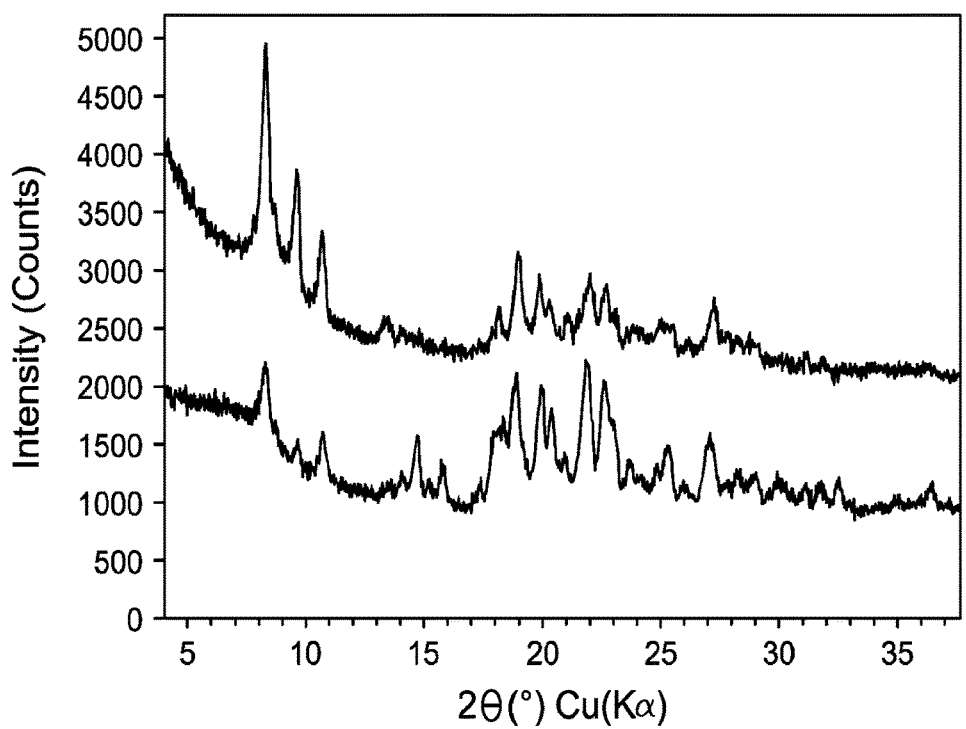
FIG. 4 shows partial X-ray diffraction patterns for the calcined (upper line) and "as-synthesized" (lower line) forms of the STT structure type material made according to the invention.

FIG. 4 shows an expanded portion of the XRD pattern of "as-synthesized" STT-phase material made according to the invention (lower line) compared to the calcined form (upper line). It can be seen that the calcination has caused the peak intensities to become more similar to those of conventional SSZ-23, possibly because the Ni$^{2+}$ cations have moved away from near the centers of the zeolite cages and adopted positions closer to the framework atoms.

Example 2—Borosilicate STT Molecular Sieve (as-Synthesized Form)

Example 1 was repeated except that 0.087 g NaCl was added to bring the Na/Si mole ratio to 0.1 and 0.02 g seeds of the product from Example 1 were added. After 24 days, the product was determined to be SSZ-23.

$^{11}$B MAS NMR spectra were collected on the product from Example 1 and on a borosilicate standard of known composition. Comparison of the relative intensities with the standard borosilicate sample indicated 2.45% boron in the as-synthesized molecular sieve.

Example 3—Borosilicate ITE Molecular Sieve (as-Synthesized Form)

7.89 g of a solution of the hydroxide form of the [Ni(TEPA)]$^{2+}$.(OH$^-$)$_2$ solution described above ([Ni]=0.57 mmol/g) was mixed with 0.57 g deionized water inside a Teflon liner for a 23-mL steel Parr autoclave. 0.19 g boric acid was then dissolved into this solution. 2.25 g of Ludox AS-40 (40 wt % SiO$_2$) was then mixed into the solution to create a uniform suspension. The liner was then capped, sealed inside the 23-mL autoclave, and heated at 160° C. under tumbling conditions (~40 rpm). After 18 days, the reactor was removed and allowed to cool to ambient temperature. The solids were then isolated by filtering through a Buchner funnel, washing copiously with deionized water, and drying in an oven at 100° C. Powder XRD showed the material to be an ITE-type phase. The material contained 9.2 wt % Ni.

Example 3a—Borosilicate ITE Molecular Sieve (Calcined Form)

Figure 3:
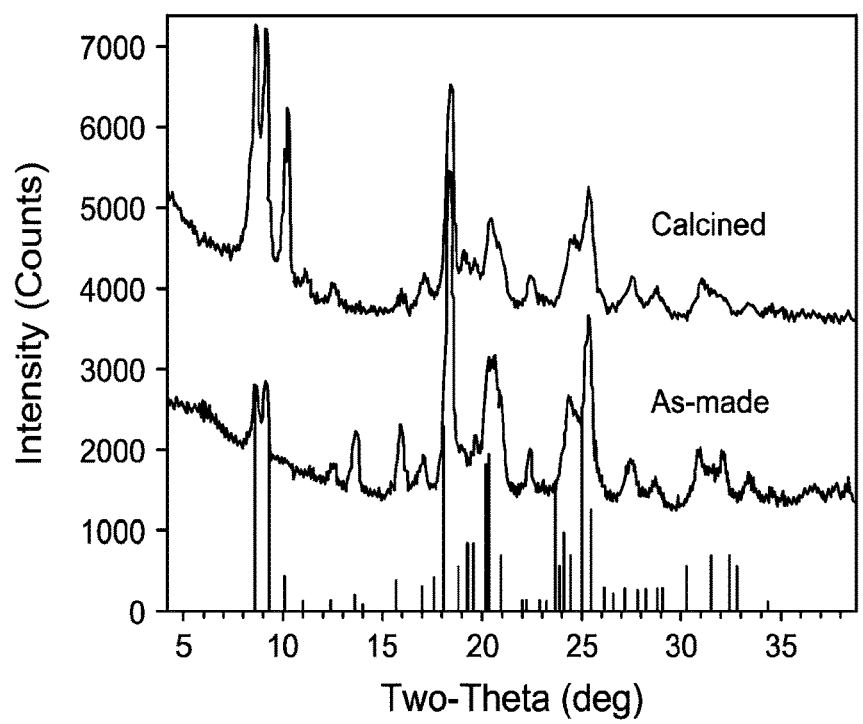
FIG. 3 shows X-ray diffraction patterns for the calcined (upper line) and the "as-synthesized" (lower line) forms of the ITE structure type material made according to the present invention with line markers showing the peak positions and intensities for ITQ-3.

After calcination of the product of Example 3 in air at 600° C. (same conditions as in Example 1a), this product has a micropore volume of 0.125 cm$^3$/g with 131 m$^2$/g external surface area. FIG. 3 shows XRD patterns of the calcined (upper line) and "as-synthesized" forms to the ITE framework type material made according to the invention with line markers showing peak positions and relative intensities for ITQ-3.

It will be appreciated that various presently unforeseen or unanticipated alternatives, modifications, variations or improvements therein may be subsequently made by those skilled in the art, and are also intended to be encompassed by the following claims.

The disclosures of the foregoing publications are hereby incorporated by reference in their entirety. The appropriate components and aspects of the foregoing publications may also be selected for the present materials and methods in embodiments thereof.

I claim:

1. A process for producing a molecular sieve of framework type STT or ITE, the process comprising the steps of:
   (i) preparing a synthesis mixture capable of forming a molecular sieve, said synthesis mixture comprising water, a source of silicon, a source of a trivalent element X, optionally a source of a pentavalent element Z, optionally a source of hydroxide ions, optionally a source of halide ions and optionally a source of alkali metal ions M$^+$, the synthesis mixture further comprising, as structure directing agent Q, [L(DETA)$_2$]$^{2+}$ cation or [L(TEPA)]$^{2+}$ cation, or a mixture thereof, where L is a divalent metal cation comprising at least one of Ni, Co and Mn;
   (ii) heating said synthesis mixture under crystallisation conditions for a time of from about 1 to about 100 days to form crystals of said molecular sieve of structure type STT or ITE; and
   (iii) recovering said crystals of the molecular sieve from the synthesis mixture.

2. The process of claim 1, wherein the synthesis mixture does not contain any pentavalent element Z.

3. The process of claim 1, wherein X is selected from Al and B.

4. The process of claim 1, wherein L is Ni.

5. The process of claim 1, wherein the structure directing agent Q is present in its hydroxide or nitrate form.

6. The process of claim 1, wherein the synthesis mixture has the following molar ratios:

| | |
|---|---|
| SiO$_2$:X | 1 to 20. |
| Q/SiO$_2$ | 0.04 to 0.5, |
| HO/SiO$_2$ | 5 to 100, |
| M$^+$/MSiO$_2$ | 0 to 0.45, |
| OH$^-$/SiO$_2$ | 0.2 to 0.5, |
| W$^-$/SiO$_2$ | 0 to 1. |

7. The process of claim 1, wherein the molecular sieve is SSZ-23 and Q is [Ni(DETA)$_2$]$^{2+}$ cation.

8. The process of claim 1, wherein the molecular sieve is ITQ-3 and Q is [Ni(TEPA)]$^{2+}$ cation.

9. A molecular sieve of structure type STT or ITE containing, within its pore structure, a structure directing agent Q selected from [L(DETA)$_2$]$^{2+}$ cation, [L(TEPA)]$^{2+}$ cation, and mixtures thereof, wherein L is a divalent metal cation comprising at least one of Ni, Co and Mn.

10. The molecular sieve of claim 9, made by a process comprising the steps of:
    (i) preparing a synthesis mixture capable of forming a molecular sieve, said synthesis mixture comprising water, a source of silicon, a source of a trivalent element X, optionally a source of a pentavalent element Z, optionally a source of hydroxide ions, optionally a source of halide ions W-, and optionally a source of alkali metal ions M+, the synthesis mixture further comprising, as structure directing agent Q, [L(DETA)2]2+ cation or [L(TEPA)]2+ cation, or a mixture thereof, where L is a divalent metal cation comprising at least one of Ni, Co and Mn;
    (ii) heating said synthesis mixture under crystallisation conditions for a time of from about 1 to about 100 days to form crystals of said molecular sieve of structure type STT or ITE; and
    (iii) recovering said crystals of the molecular sieve from the synthesis mixture.

11. A molecular sieve of structure type STT or ITE, as made by calcination of the molecular sieve of claim 9.

12. The molecular sieve of claim 9, wherein L is present in an amount of about 1 to about 10 wt %.

13. The molecular sieve of claim 9, wherein L is Ni.

14. A process comprising contacting a feedstream comprising one or more adsorbates under adsorption conditions with the molecular sieve of claim 9.

15. A process for converting a feedstock comprising converting an organic compound to a conversion product which comprises contacting said feedstock at organic compound conversion conditions with a catalyst comprising the molecular sieve of claim 9.

* * * * *